United States Patent
Lopez et al.

(10) Patent No.: US 10,861,052 B1
(45) Date of Patent: Dec. 8, 2020

(54) MULTI-CHANNEL PERSISTENT CAMPAIGN MANAGEMENT

(71) Applicant: Amazon Technologies, Inc., Reno, NV (US)

(72) Inventors: Gustavo Eduardo Lopez, Seattle, WA (US); Mary Miller, Kirkland, WA (US); Karthik Narayan, Seattle, WA (US)

(73) Assignee: Amazon Technologies, Inc, Seattle, WA (US)

( * ) Notice: Subject to any disclaimer, the term of this patent is extended or adjusted under 35 U.S.C. 154(b) by 259 days.

(21) Appl. No.: 15/236,119

(22) Filed: Aug. 12, 2016

(51) Int. Cl.
*G06Q 30/00* (2012.01)
*G06Q 30/02* (2012.01)

(52) U.S. Cl.
CPC ..... *G06Q 30/0269* (2013.01); *G06Q 30/0277* (2013.01)

(58) Field of Classification Search
None
See application file for complete search history.

(56) References Cited

U.S. PATENT DOCUMENTS

| | | | | |
|---|---|---|---|---|
| 2008/0255915 A1* | 10/2008 | Collins | ............. | G06Q 10/0631 705/7.12 |
| 2014/0074616 A1* | 3/2014 | Johnson | ................. | G06Q 30/02 705/14.64 |
| 2015/0088624 A1* | 3/2015 | Frederick | ........... | G06Q 30/0209 705/14.12 |
| 2017/0068982 A1* | 3/2017 | Vangala | ............. | G06Q 30/0224 |

\* cited by examiner

*Primary Examiner* — Alvin L Brown
(74) *Attorney, Agent, or Firm* — Hogan Lovells US LLP (57) ABSTRACT

Management of persistent campaigns can be automated across multiple possible communication channels. A campaign management service monitors state information for the targeted users to ensure that the campaign content is provided to those users at appropriate times using appropriate channels. After a state change is detected for a particular user, corresponding to the desired action being taken, the campaign content will no longer provided for that user across any of those channels. The ability to manage state across all channels ensures that the providing of campaign content to any targeted users does not exceed frequency, occurrence, or other such criteria, and the types of actions can be any detectable actions performed with respect to an electronic environment.

19 Claims, 7 Drawing Sheets

MULTI-CHANNEL PERSISTENT CAMPAIGN MANAGEMENT

BACKGROUND

There are many situations in which a provider of electronic content might want to prompt a user to perform a specific action. This action can be a direct benefit to the provider, such as where the provider want the user to take an action on behalf of the provider, or an indirect benefit, where the user taking the action primarily benefits a third party but the third party will compensate the provider in some way for the action being taken. Delivering these requests to users can be difficult, as too many notifications using a single approach such as email can result in a negative experience for the user, but it can be difficult to manage notifications or requests sent concurrently through different approaches. Further, if different approaches are used it can be difficult to determine whether or not the user has actually taken the action such that the requests or notifications across the various approaches should be stopped.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Approaches described and suggested herein relate to the management of campaigns for targeted users. In particular, various embodiments provide for the automated management of persistent campaigns across various types of communication channels. A campaign management service can monitor a state of the targeted users to ensure that the campaign content is provided to those users until the users perform a desired action corresponding to the campaign. After a state change is detected for a particular user, the campaign content will no longer provided for that user across any of those channels. The ability to manage state across all channels ensures that the providing of campaign content to any targeted users does not exceed frequency, occurrence, or other such criteria that may be specified for the campaign. The types of actions for the campaigns can be any detectable actions performed with respect to an electronic environment, as may correspond to the user taking, instructing, or triggering a specific task or event in the electronic environment.

Various other such functions can be used as well within the scope of the various embodiments as would be apparent to one of ordinary skill in the art in light of the teachings and suggestions contained herein.

Figure 1:
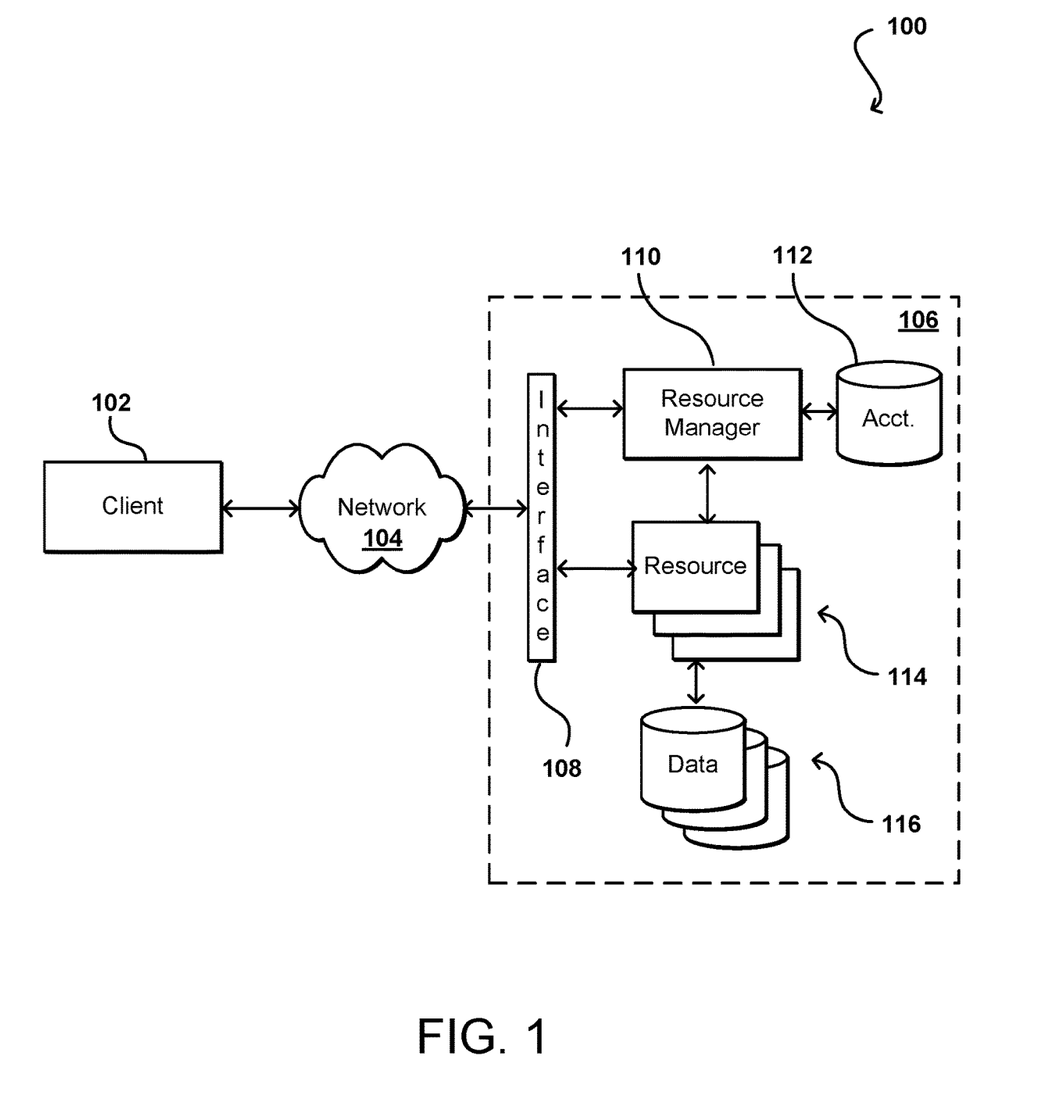
FIG. 1 illustrates an example environment in which various embodiments can be implemented.

FIG. 1 illustrates an example environment 100 in which aspects of the various embodiments can be implemented. In this example a user is able to utilize a client device 102 to submit requests across at least one network 104 to a resource provider environment 106. The client device can include any appropriate electronic device operable to send and receive requests, messages, or other such information over an appropriate network and convey information back to a user of the device. Examples of such client devices include personal computers, tablet computers, smart phones, notebook computers, and the like. The network 104 can include any appropriate network, including an intranet, the Internet, a cellular network, a local area network (LAN), or any other such network or combination, and communication over the network can be enabled via wired and/or wireless connections. The resource provider environment 106 can include any appropriate components for receiving requests and returning information or performing actions in response to those requests. As an example, the provider environment might include Web servers and/or application servers for receiving and processing requests, then returning data, Web pages, video, audio, or other such content or information in response to the request.

In various embodiments, the provider environment may include various types of electronic resources that can be utilized by multiple users for a variety of different purposes. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the provider environment includes a plurality of electronic resources 114 of one or more types. These types can include, for example, application servers operable to process instructions provided by a user or database servers operable to process data stored in one or more data stores 116 in response to a user request. As known for such purposes, the user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 114 can submit a request that is received to an interface layer 108 of the provider environment 106. The interface layer can include application programming interfaces (APIs) or other exposed interfaces enabling a user to submit requests to the provider environment. The interface layer 108 in this example can also include other components as well, such as at least one Web server, routing components, load balancers, and the like. When a request to provision a resource is received to the interface layer 108, information for the request can be directed to a resource manager 110 or other such system, service, or component configured to manage user accounts and information, resource provisioning and usage, and other such aspects. A resource manager 110 receiving the request can perform tasks such as to authenticate an identity of the user submitting the request, as well as to determine whether that user has an existing account with the resource provider, where the account data may be stored in at least one data store 112 in the provider environment. A user can provide any of various types of credentials in order to authenticate an identity of the user to the provider. These credentials can include, for example, a username and password pair, biometric data, a digital signature, or other such information.

The resource provider can validate this information against information stored for the user. If the user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 102 to communicate with an allocated resource without having to communicate with the resource manager 110, at least until such time as a relevant aspect of the user account changes, the user is no longer granted access to the resource, or another such aspect changes.

The resource manager 110 (or another such system or service) in this example can also function as a virtual layer of hardware and software components that handles control functions in addition to management actions, as may include provisioning, scaling, replication, etc. The resource manager can utilize dedicated APIs in the interface layer 108, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 108 in at least one embodiment includes a scalable set of customer-facing servers that can provide the various APIs and return the appropriate responses based on the API specifications. The interface layer also can include at least one API service layer that in one embodiment consists of stateless, replicated servers which process the externally-facing customer APIs. The interface layer can be responsible for Web service front end features such as authenticating customers based on credentials, authorizing the customer, throttling customer requests to the API servers, and validating user input. The API layer also can be responsible for reading and writing database configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures.

Figure 2:
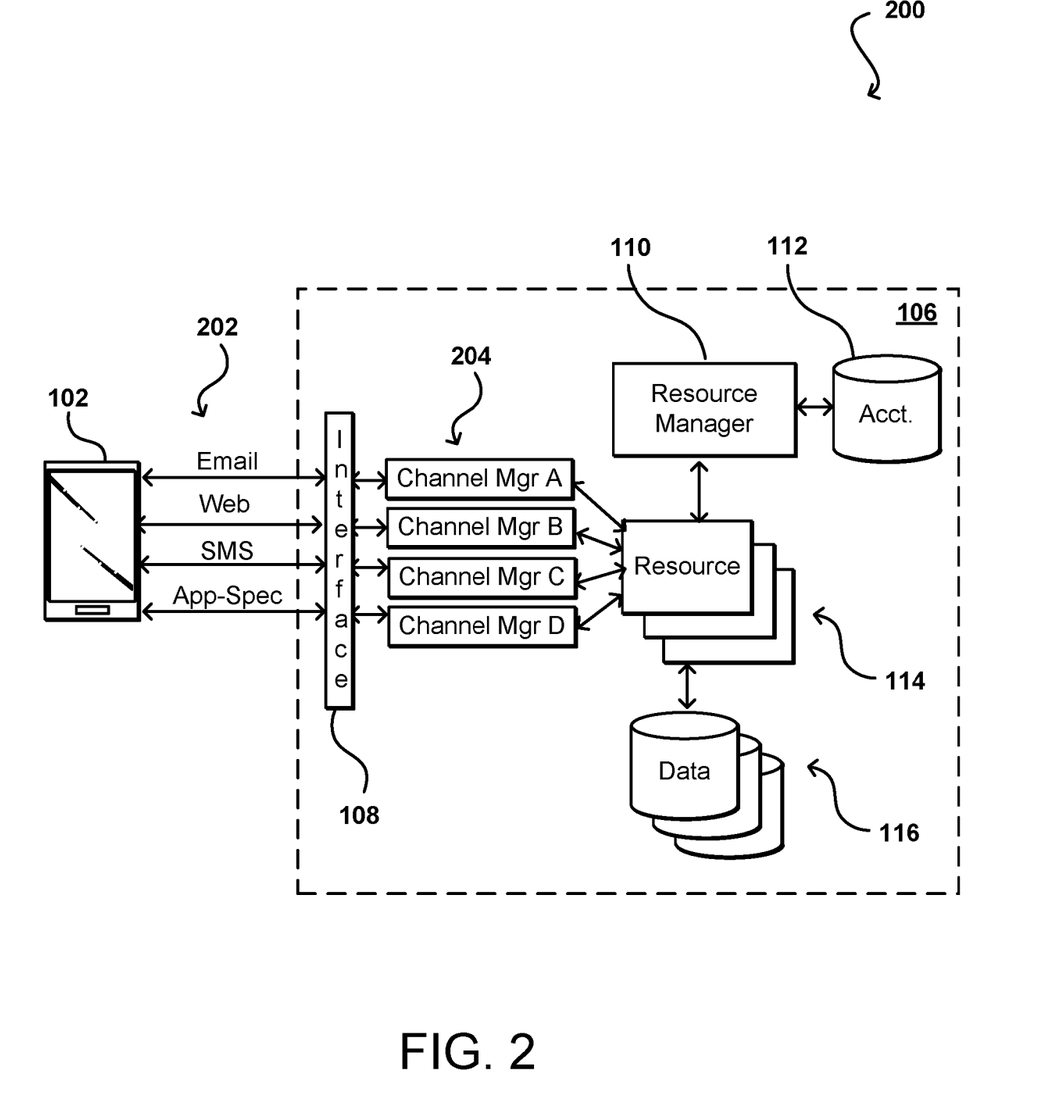
FIG. 2 illustrates an example system wherein content can be delivered via multiple communication channels that can be utilized in accordance with various embodiments.

As mentioned, there may be situations where a content provider or resource provider might want to prompt a certain action or behavior in a user. This can include, for example, requesting that the user perform a specific task through notifications or requests sent to the user through various communication channels. As illustrated in the example implementation 200 of FIG. 2, resources of a resource provider environment can be configured to work with various channel managers 204 to send notifications over various communication channels 202, as may include an email channel, a Web or Internet channel, a messaging (e.g., SMS or IM) channel, or an application specific channel, among others. Potential channels can also include gaming channels, media streams or broadcasts, social media conversations, and the like.

There is currently no convenient way, however, to manage such a campaign in an automated way across the various channels so that a sufficient number of notifications is delivered, but in such a way that the notifications are not overwhelming for the user. Further, for persistent campaigns that are intended to be ongoing there is no easy way to continually monitor whether the action has been taken and ensure that messages are delivered until that action occurs, and then do not occur for that particular user after the action has occurred. Further, there is currently no way to accurately determine the relative impact of each channel with respect to the action or user, in order to cause the notifications or requests to be sent over the most effective channel(s) for a particular user, action, or campaign.

Accordingly, approaches in accordance with various embodiments utilize a campaign manager service that can accept (or otherwise determine) the terms for a persistent campaign, and automatically manage the notifications for that campaign across multiple communication channels. The campaign manager service can determine the list of users (or devices or other entities) for which the action is desired to occur, and can track a "state" of the action for each user. The state in at least some cases can be a binary state, wherein the user either has or has not performed the desired action. The campaign manager service can manage the notifications or requests up until a state change is detected for a particular user that the desired action has been performed, after which the campaign manager can ensure that no notifications or requests for that campaign are delivered over any of the various communication channels to be presented to the user.

Figure 3:
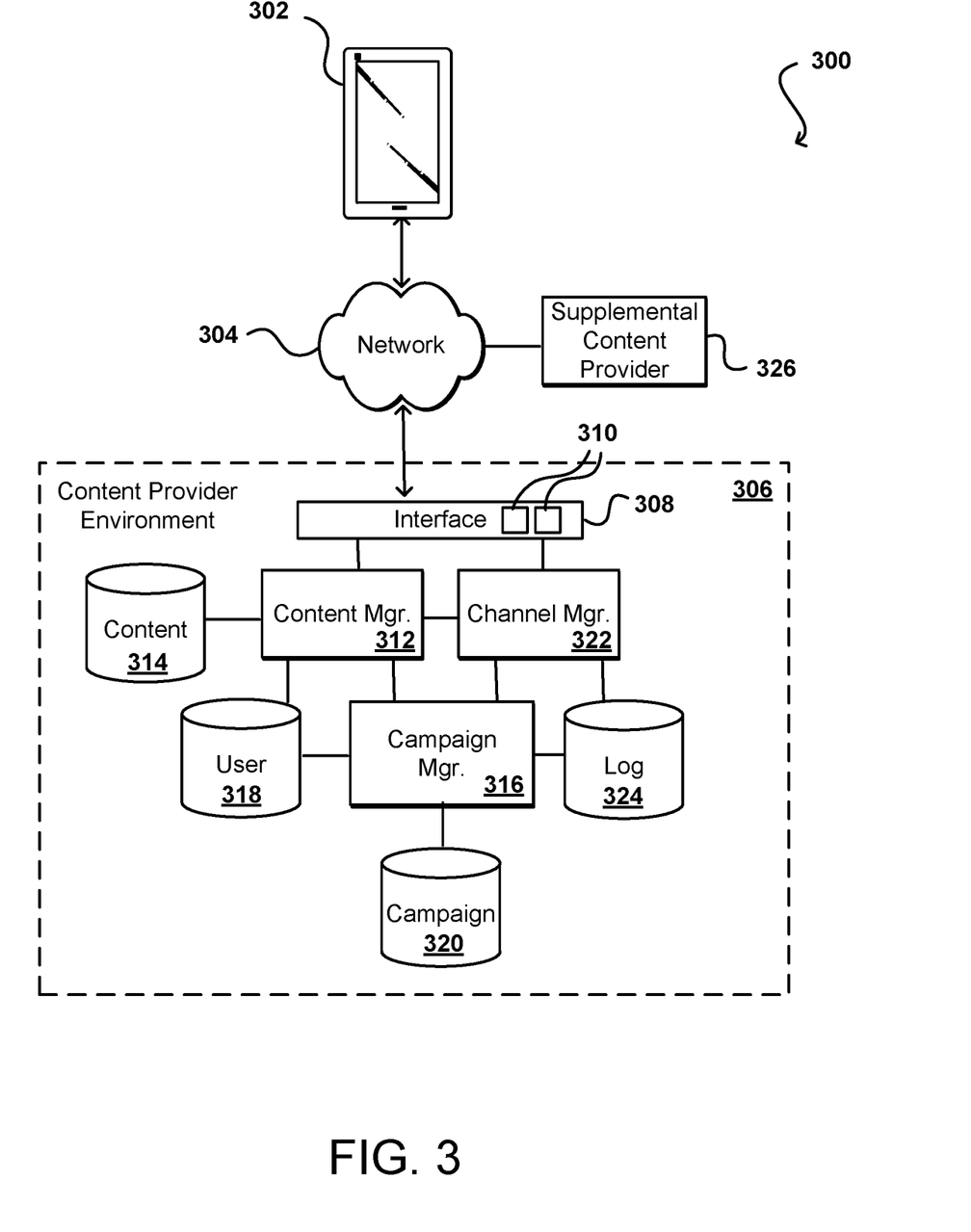
FIG. 3 illustrates an example system for managing a persistent campaign across multiple channels that can be utilized in accordance with various embodiments.

FIG. 3 illustrates an example system 300 for managing a persistent campaign that can be utilized in accordance with various embodiments. In this example, a client device 302 can be in electronic communication with a content provider system 306 via at least one network 304 as discussed previously. The communication can be initiated by the client device 302 via a request, can take the form of a push notification from the content provider system 306, or can be a communication on a persistent communication connection, among other such options. In the case where an application (e.g., a web browser, media player, e-book reader, or gaming application) requests content from the content provider system 306, the request can be received to an interface (e.g., an API 310) of an interface layer 308, and components such as routers or load balancers can cause information for the request to be directed to an appropriate content manager 312, which can take the form of a Web server or other such component within the scope of the various embodiments. The content manager 312 can analyze the information for the request and can determine the appropriate content from at least one content repository 314. As part of the determination, the content manager 312 may also check data from a user data repository 318 to ensure that the user and/or client device has the appropriate access rights to the content. The content manager 312 can then cause the requested content to be provided to the client device, whether by sending the content, streaming the content, providing the content for download, or via other such mechanism. For certain content such as Web content, the content manager may also have to determine the layout for the content and generate the code for the page to be rendered on the client device 302.

In at least some instances, the content manager may need to provide supplemental content with the primary content as well. This supplemental content can include any additional content related to the primary content, the user, or the client device, etc., that is to be provided and/or presented with the primary content. The supplemental content can include, for example, descriptive text, audio commentary, user communications, advertising or promotions, live streaming content, and the like. In some cases the supplemental content will be associated with the primary content such that the content manager 312 does not have to determine or select content, but instead provides the supplemental content identified in association with the primary content or identified in the user request, among other such options.

In other instances, the supplemental content may be determined dynamically based upon various factors. For instance, there may be communications or information that need to be provided to the user. Similarly, if advertising or promotional content is to be included, information associated with the primary content, user, or client device can be used to dynamically select advertising to be provided with the primary content. This advertising can be obtained from the content repository 314 or another location in the content provider environment 306, or obtained from a third party supplemental content provider 326, among other such options. As known for selecting advertising or promotional content, various keywords or other criteria can be analyzed using an advertising selection algorithm, and advertising content can be selected based upon factors such as relevance and bid pricing. Conventional approaches for determining advertising are well known in the art and as such will not be discussed herein in detail.

As part of the options available for supplemental content, a customer of the content provider environment or other such entity might initiate a campaign with the content provider. A campaign as used herein refers to content that relates to a common theme or concept, which can have defined criteria such as types of people to receive the campaign content and success or target performance criteria, among other such options. A customer or other entity wanting to launch a campaign with the content provider can submit a request to an appropriate API 310 or other interface of the content provider system 306, and can provide the appropriate information for the campaign. The campaign content can include, for example, the actual "creative" content to be provided for presentation to users or viewers. This creative content can include, for example, textual content, graphic content, audio content, video content, or other such content that conveys the message or information for the campaign. In many instances, this will include advertisements or sponsored links that upon selection will direct a user to obtain content relevant to the campaign. In other embodiments, this may include text or graphic content that prompt a user to take a specific action, and may provide a link or other such element that enables the user to quickly and/or easily take the corresponding action.

The customer can also specify various campaign criteria to be used in determining when to display the campaign content. This can include, for example, criteria for a type of user to receive the campaign content, such as may relate to a geographic location, demographic category, account type, action history, and the like. There may also be criteria on the type of primary content with which the campaign content is to be displayed, such as video or e-book content, types of preferred or forbidden topics, content from certain providers, etc. As known for advertising and promotional content, the customer may also specify bid prices for specific keywords or topics that can be compared against other bids relevant to the primary content. The criteria can also specify aspects such as the channels to be used to display the campaign content, a frequency of display, performance targets or thresholds, end point criteria, and the like. In some embodiments the criteria can include a maximum rate of spend, whereby campaign content is not shown for a period of time when the cost of the campaign meets or exceeds a specified rate or amount.

In some instances it might be desirable for the campaign to be a persistent campaign. A persistent campaign, as used herein, refers to a campaign wherein the campaign is ongoing and campaign content should be provided to members of the campaign target group (i.e., targeted users) until each of those members takes a specified action with respect to the campaign. The specified actions can include, for example, performing the requested, prompted, or desired action, or requesting removal from the campaign, among other such options. For advertising content, the desired action might be to view specific content or purchase a specified product or service. For informational content, it might be to view and acknowledge the informational content. For specific actions, such as to update software, answer a posed question, or accept a new terms of service, the action might involve performing the specified action. The campaign criteria can request that the campaign content be shown to each targeted user until that user takes one of the specified actions. Various other single actions can be identifier as well, such as to sign a user agreement, schedule a periodic maintenance or medical appointment, accept a package delivery, and the like.

In some conventional campaigns, ongoing campaigns can display content repeatedly through a specified channel. This can include, for example, repeatedly showing banner ads with Web content or sending push or email messages to the respective customers. This approach is not optimal, however, as a particular user may not respond well to content sent over such a channel. For channels such as advertising and email, the user also may have the option to block the content or request that the content no longer be delivered over that channel. For channels such as posters, billboards, or traditional mail, it can be impractical at best to attempt to determine which users actually viewed the campaign content. Accordingly, it can be desirable to provide the content using various types of channels in ways that are likely to be most effective for the campaign. Such an approach requires management and tracking of content conveyed over the various channels, in order to ensure that the user is not getting bombarded with the content to the point where the user is unlikely to take the desired action. Further, it is difficult to track the actions taken across all the disparate systems and channels to ensure that the campaign content is no longer displayed to that user once the user takes the corresponding action.

Accordingly, approaches in accordance with various embodiments provide a mechanism for managing persistent campaigns across multiple channels for various types of supplemental content. A campaign manager 316 can keep track of the actions taken by various users, and can make sure that the campaign content is displayed to the targeted users using approaches that are more likely to be successful for the various users. The campaign manager can also store data that can be used to generate reports regarding performance and success of the various campaigns, and can dynamically modify the implementation of the campaign over time based at least in part upon the performance and success metrics. An API or other interface can also be provided that can enable a customer to query performance data for the campaign, including number of users having taken the action, channel-specific performance statistics, total amount spent thus far on the campaign, and other such information.

In the example system 300 of FIG. 3, the content manager 312 can communicate with the campaign manager 316 to determine when campaign content is to be provided to a particular client device 302. This can include various opportunities for providing content, as may include supplemental content included with primary content requested by the user, campaign content sent periodically to the user via certain channels, or campaign content pushed to the client device, among other such options. The campaign manager 316 can store the campaign criteria and related information in a campaign repository 320, which in some embodiments can also store identify information for each user, device, or other entity identified as a campaign target. In some embodiments the campaign customer will identify the campaign targets, while in other embodiments the customer will provide the campaign criteria and the campaign manager 316 can analyze information from a user data store 318 to identify the various campaign targets. The campaign manager 316 can cause campaign content to be displayed to the various users using various communication channels, as may be determined and managed at least in part using a channel management service 322 that can communicate with individual channel managers for the various communication channels. The campaign manager 316 can also cause information to be logged to an event log 324 or other such repository each time campaign content is provided for a particular user. The campaign manager 312 can also be configured to be notified by the appropriate system, service, or component once the specified action is performed by one of the targeted users. The campaign manager can then log information for this action to the appropriate location, such as to the user data store 318, campaign repository 320, or event log 324, among other such options. The campaign manager can also set a flag or other such value indicating a state change for the user having taken the action. The state change can represent a binary change, such as where a user either has yet to take an action or has taken the action. Other state values may be set as well, such as partially completed, in progress, etc. Once a state change occurs and is stored to the system that identifies the user has completed the desired action (or should otherwise no longer receive campaign content), the campaign manager 316 can ensure that the campaign content is no longer provided to the user or client device 302 using any of the various channels. Similarly, the campaign manager can ensure that the campaign content continues to be provided to the user or client device until such action is taken or the campaign is terminated.

In one example, a customer might want to launch a campaign to have users try out a specified new product or service. The customer might specify criteria for targeting users, and request that the campaign "follow" the user across various channels associated with the content provider until those users try the product or service. The persistent campaigns can have various common characteristics, such as continuing in perpetuity for a customer and not being easily gamed by users to gain unintended benefits where value is provided for taking the requested action. Further, the offer or action should no longer be available once accepted or taken, and the value of the campaign to the content provider should be such that it is worth the providing of the campaign content repeatedly over multiple channels instead of alternative content that could otherwise generate revenue or other types of value. Further, the campaign should be of sufficient value and interest to warrant the risk that users continually exposed to the campaign content will not be turned off from accessing content from the content provider.

Figure 4A:
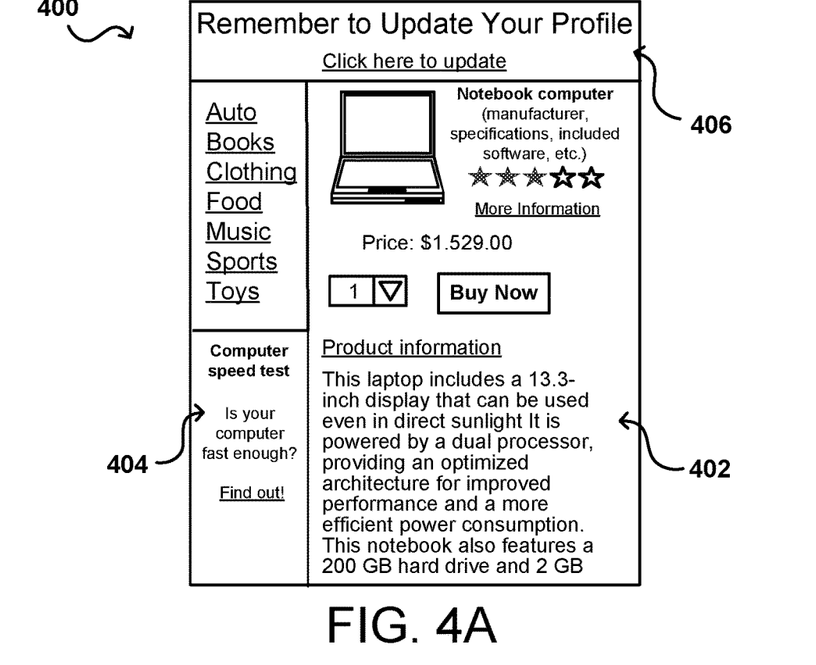
FIGS. 4A and 4B illustrate example displays of campaign communications that can be presented in accordance with various embodiments.
Figure 4B:
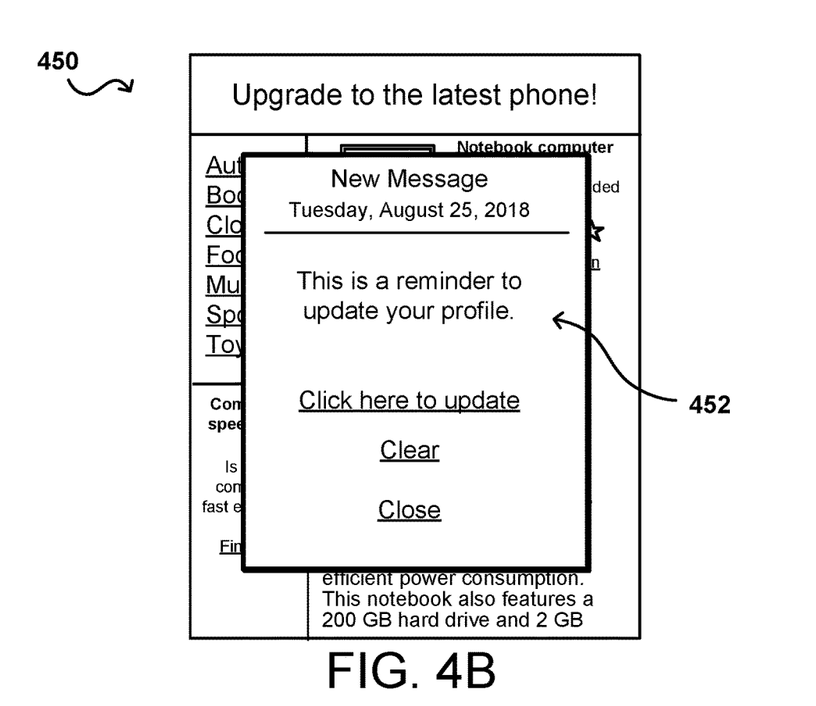

In some embodiments, the customer can designate the channels to be utilized. For example, the customer can indicate that the campaign content should be delivered through web ads, in-app content, and gaming content, but not through SMS or email channels. In other embodiments the channels might be determined based at least in part upon the type of campaign content that is provided. For example, if only banner or video ads are provided then only channels that support those types of ads will be utilized. For example, as illustrated in the display 400 of FIG. 4A, a banner ad 406 is included with primary content 402 and other supplemental content displayed through a webpage to remind the user to perform a certain action. The display 450 illustrated in FIG. 4B instead shows a push notification 452 that includes text content requesting that the user perform a specific action. These channels could have been selected based upon the type of content provided, and the customer can provide varying types of content to enable the content to be transmitted via specific or various communication channels. The channels also may be determined based at least in part upon performance criteria specified by the customer. For example, some channels may have higher performance values than others, such as where a user is more likely to click on a push notification than an in-app advertisement. Accordingly, the campaign may not provide the content through the lower performing channels. In other embodiments, the type of channel used may change over time, as the likelihood of success changes. For example, a user might be most likely to respond to an ad after seeing it for five or six times, after which the likelihood decreases with subsequent viewings. It might be the case that the displaying of a push notification is not being successful such that at some point a banner ad is more likely to result in a desired action, such that the next display of the campaign content to a particular user can be via banner ad. Similarly, performance might be improved by initially showing over multiple channels, or specific combinations of channels, which might be determined in aggregate or on a per-user basis, among others. A weighting or ordering of channels might then be used to determine which channel to next use to display the campaign content to a user. In other embodiments each channel may be managed separately with weighting or bid scores adjusted over time, and the selection for each channel can then be based upon conventional supplemental content selection algorithms. If a specific channel should be used to next display the content, then the weighting or bid price can be adjusted accordingly to increase the likelihood of selection.

As mentioned, a log can be maintained that indicates which channels have been used to convey campaign content to a targeted user, as well as the number of times each channel was used to convey the content. This can be used to adjust the weighting and pricing as discussed previously. In some embodiments channels that perform below a specified level, in aggregate or for specific users or types of users, can be removed from the campaign. For certain channels there may also be a maximum number of frequency of use. For example, a campaign might specify that only one SMS message is to be sent to any given user for a campaign, or that email messages are sent at most once a month. A customer might also specify that a user is not to see campaign content more than two or three times a day across any or all channels. Various other limits or criteria can be set as well. In some embodiments the campaign manager can perform an initial sampling during a testing phase for a campaign to determine the performance of various channels for different types of users, and may automatically adjust the weightings, bid prices, or other settings for those users or channels based upon the data accrued and analyzed during the testing phase.

As mentioned, the customer can also provide targeting criteria that cause the campaign content to be displayed with specific types of primary content or in specific situations. For example, a food delivery company might want advertising to be displayed when a user is watching a movie or viewing food-related content, but not when streaming a workout playlist to a fitness tracking device. Similarly, an enterprise prompting a user to make a change to a work account might want the campaign content to only be displayed at times or locations when the user should be working, or through channels that are related to the work environment. The enterprise might not want the work campaign content to be displayed through a smart TV at the user's home on a Saturday night. If the content is an audio notification, the enterprise might want the content presented through work applications or browsers, but not through gaming consoles or personal devices that are offsite. The user can thus specify categories, times, locations, or other display or presentation criteria.

In some embodiments, the content provider system might also provide supplemental content to be displayed with primary content provided by other providers. For example, the content provider might provide advertising content to be displayed on websites provided by other entities. Accordingly, the content provider can adjust bid pricing or other criteria to cause the campaign content to be displayed via other channels as well, even if those channels are provided by other providers outside the resource provider environment. A report of any resulting actions taken by the user can be provided back to the campaign manager in order to track the change in state. If the customer makes any changes to the campaign, such as by adjusting an amount of compensation or updating the campaign content, then the campaign manager can ensure that the updates are propagated to the various channels as well. The campaign can also add new channels over time, such as by the campaign customer providing audio content that can be conveyed through a streaming media device or network radio application. If a specific channel becomes available for a user after the campaign launch, such as when a user buys a streaming media device or smart television, then that channel can be added into the set of channels over which that user can receive campaign content.

Information can also be aggregated across campaigns for individual users, groups of users, or overall levels of performance. For example, the interaction of a particular user with campaign content can be monitored or analyzed over time to determine which channels or types of content are most effective, and even which channels are most or least effective for specific types of content or campaigns. This information can then be used to determine when and where to surface campaign content to targeted users. In some embodiments a machine learning algorithm can be used to learn and update performance expectations for various channels and types of content that can be used for specific campaigns when determining value and expectations.

As mentioned, in some embodiments the campaign manager can work with an advertising manager or provider to ensure that the campaign content is considered for selection any time an advertisement is to be displayed to a targeted user. Similarly, a content manager can be configured to contact the campaign manager any time there is an opportunity to provide supplemental content to determine whether campaign content should be provided for this particular user or client device. Any context for the opportunity can also be provided in order to determine whether there are any relevant campaign opportunities. This can include, for example, any category, keyword, query, location, time, or subject matter data that might be useful in determining whether to surface campaign content for this opportunity.

Further, various reporting options can be made available for campaign data. For example, various read interfaces may be provided wherein an authorized entity can query the top performing campaigns for a channel, the various campaigns that are active across all channels, and other such information. An individual customer can also query performance data for their campaign against aggregate or average performance of other or similar campaigns, as well as to compare against previous or other campaigns for a particular customer. Upon viewing the data, the entity can also have the option through a different interface of modifying one or more aspects of a particular campaign, such as to improve the performance in one or more areas.

As illustrated, in at least some embodiments the manager for each individual channel can still utilize the same logic or approaches to selecting supplemental content to be provided over the respective channel. For example, a web content provider can still use a keyword bidding or similar process to select supplemental content to be provided with a webpage. An overall channel manager can provide the information necessary for each individual channel to make a decision and to adjust the likelihood of the campaign content being selected. The channel manager can also be responsible in some embodiments for ensuring that actions taken on each channel are recorded to the appropriate event log for access and analysis by the campaign manager. In some embodiments the campaign manager or channel manager can check the event log before recommending or allowing an instance of campaign content to be displayed to a user in order to determine whether such displaying would exceed maximum frequency or amount criteria specified for the campaign, across any or all of the channels.

A further advantage to the state tracking approach is that it is robust to outages or variations in the individual channels. For example, a channel might be offline for a period of time or it may be unclear whether campaign content was actually conveyed to a user through a particular channel. In embodiments where the action taken causes the campaign manager to be notified of the action through an appropriate mechanism that may be separate from any of the individual communication channels, the campaign manager can still be aware of whether a state change occurred for a particular user. Even if a log record is not generated for that channel impression, at worst the user might see another instance of the campaign content through that channel if there has not yet been a state change for that user.

The recording of the event data to an event log or other repository also allows for some level of fraud detection. For example, information for each user, device, or action can be logged with an event, as may include an IP address, physical address, email address, phone number, payment data, and the like. The event data can be analyzed to attempt to determine whether multiple user accounts include at least some of the same data, or whether there are patterns present in the data that indicate that multiple accounts might be associated with the same user or device.

Figure 5:
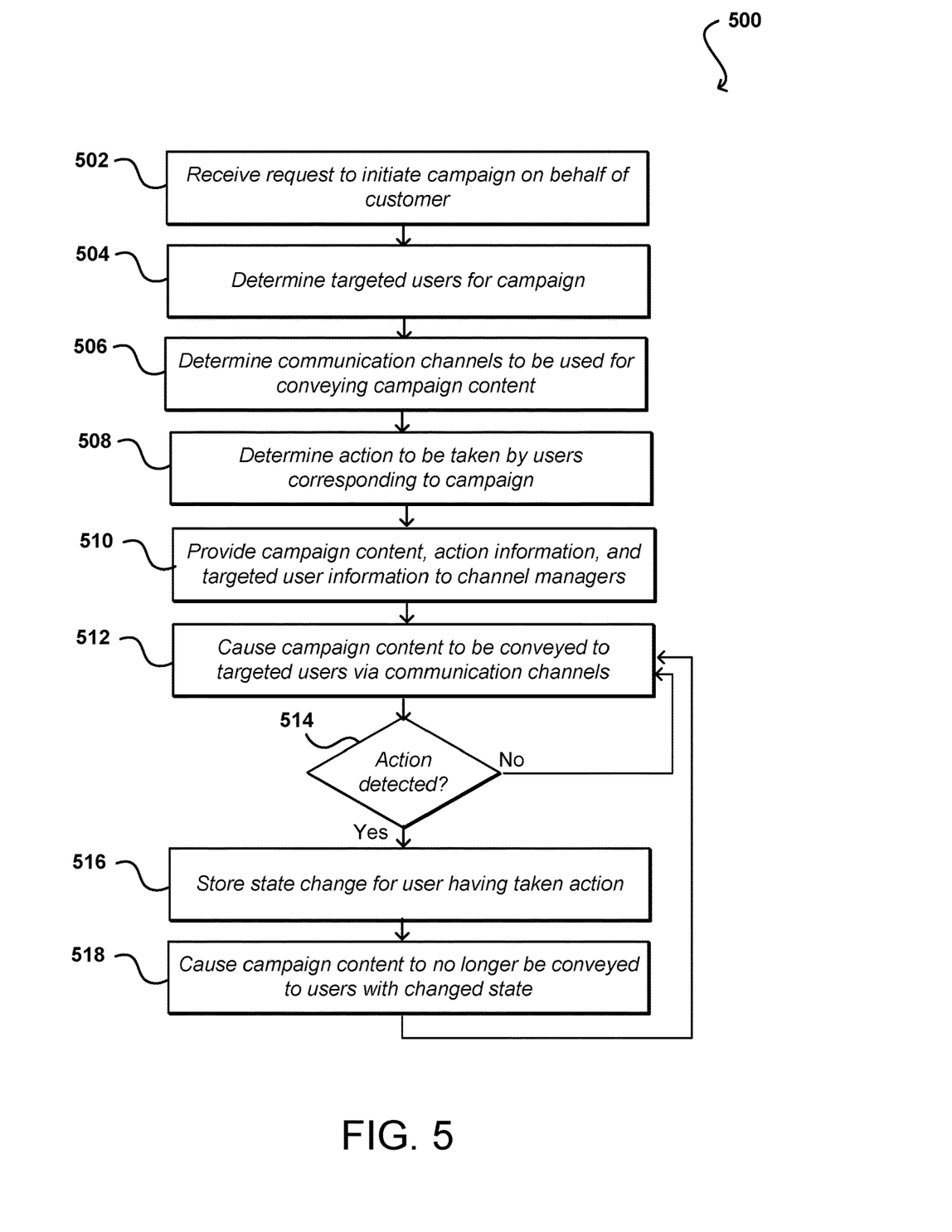
FIG. 5 illustrates an example process for managing a persistent campaign across multiple communication channels that can be utilized in accordance with various embodiments.

FIG. 5 illustrates an example process 500 for prompting a user to take a determined action that can be utilized in accordance with various embodiments. It should be understood that for any process herein there can be additional, fewer, or alternative steps performed in similar or alternative orders, or in parallel, within the scope of the various embodiments unless otherwise specifically stated. In this example, a request to initiate a campaign is received 502, where the campaign is to be launched on behalf of a specified customer. In this example, the request is received to a campaign manager or other such system or service. As mentioned, the campaign can attempt to cause various users to take specific actions associated with the campaign, as may include viewing advertising, purchasing products, accepting new terms or agreements, scheduling a specified event, completing a specified task, and so on. In order for the campaign setup to proceed there might be certain criteria or steps to be met, such as the customer setting up a customer account, logging in to an existing account, and/or agreeing to a payment method or terms for the account. During setup of the campaign, the targeted users can be determined 504. The targets users in some embodiments can be determined using campaign criteria specified by the customer. These can include, for example, users viewing specific types of primary content, having yet to perform a certain task, fitting a specific user profile, or meeting various other types of criteria. In other embodiments, the targeted users can be determined by analyzing at historical data for those and other potential users. This data can include users who have or have not taken specific actions, have historically responded well to these types of campaigns, and the like. For each of the targeted users, a record or entry can be generated that indicates that the users are each associated with a first state, where performance of the determined action for the campaign will cause those users to each be associated with a second state. These records can be stored to an appropriate record repository or other such location.

As mentioned, there can be various communication channels available for use with the campaign. As part of the campaign setup, the campaign manager (or communication manager, etc.) can determine 506 the appropriate communication channels to be used for the campaign. The channels can be selected based at least in part upon the type of campaign or targeted users, and in some instances the customer may be able to specify specific channels to be used or not used, as well as terms for the use of those channels. For example, a customer may not want the targeted users to be contacted via SMS or instant messaging, and may want the targeted users to only be contacted at most once via email. The customer can also specify a maximum frequency per channel or across channels, among other such options. In some embodiments the campaign manager can determine the appropriate channels by analyzing historical data, such as to determine the relative performance of various types of channels for similar campaigns. In some embodiments the channel selection can vary by customer or type of customer, or the weightings of the various channels can vary. In some embodiments the appropriate channel can be determined for each opportunity to provide campaign content, among other such options. The campaign manager can also determine 508 the action that is to be taken by the various targeted users that will cause a state change, and can determine how the campaign manager will determine that the action has been taken. This can include, for example, setting up an action queue or event log to which information can be written, or can involve setting up messaging or notifications from various other components throughout the environment.

Once the appropriate information has been gathered, the campaign information can be provided 510 to the various channel managers responsible for delivering the campaign content over the selected communication channels. The channel managers can then be caused 512 to convey the campaign content to the various targeted users via the respective channels. As mentioned, the channel managers can be tasked with checking an event log or other such repository to determine whether conveying the campaign information for any specific user at a particular time would exceed maximum frequency, number, or other such criteria for that user. The campaign content can then be caused 512 to be provided to the targeted users across the various channels. As mentioned, this can include sending an email message, displaying content via a website or gaming application, presenting audio content through a media player, and the like. The content can be selected using various selection criteria, and the respective channels used according to any provided campaign criteria.

As mentioned, at least periodically a determination can be made 514 as to whether an action has been taken for any of the targeted users. In some instances the determination can be made for each opportunity to show campaign content or until a push notification is received by the campaign manager, among other such options. In many situations the action will be performed and/or detected using at least one electronic or computing device, such as a smartphone, tablet, camera, or digital recorder. If an action is not detected, the process of displaying campaign content to the targeted users can continue. If an action is detected for a particular targeted user, the corresponding state change information can be stored 516 for that user having taken the action, or for whom the action was detected. As mentioned, in many cases the state will be binary, but where multiple states can occur then the state can be updated as appropriate. Once the state change is detected and recorded for a specific user, the campaign manager or another appropriate system or service can cause 518 the campaign content to no longer be conveyed to that user or other users for whom the state change was detected and recorded. The various channel managers can be tasked with checking state for the targeted users before providing campaign content, such that the delivery of campaign content is consistent across the various channels.

Figure 6:
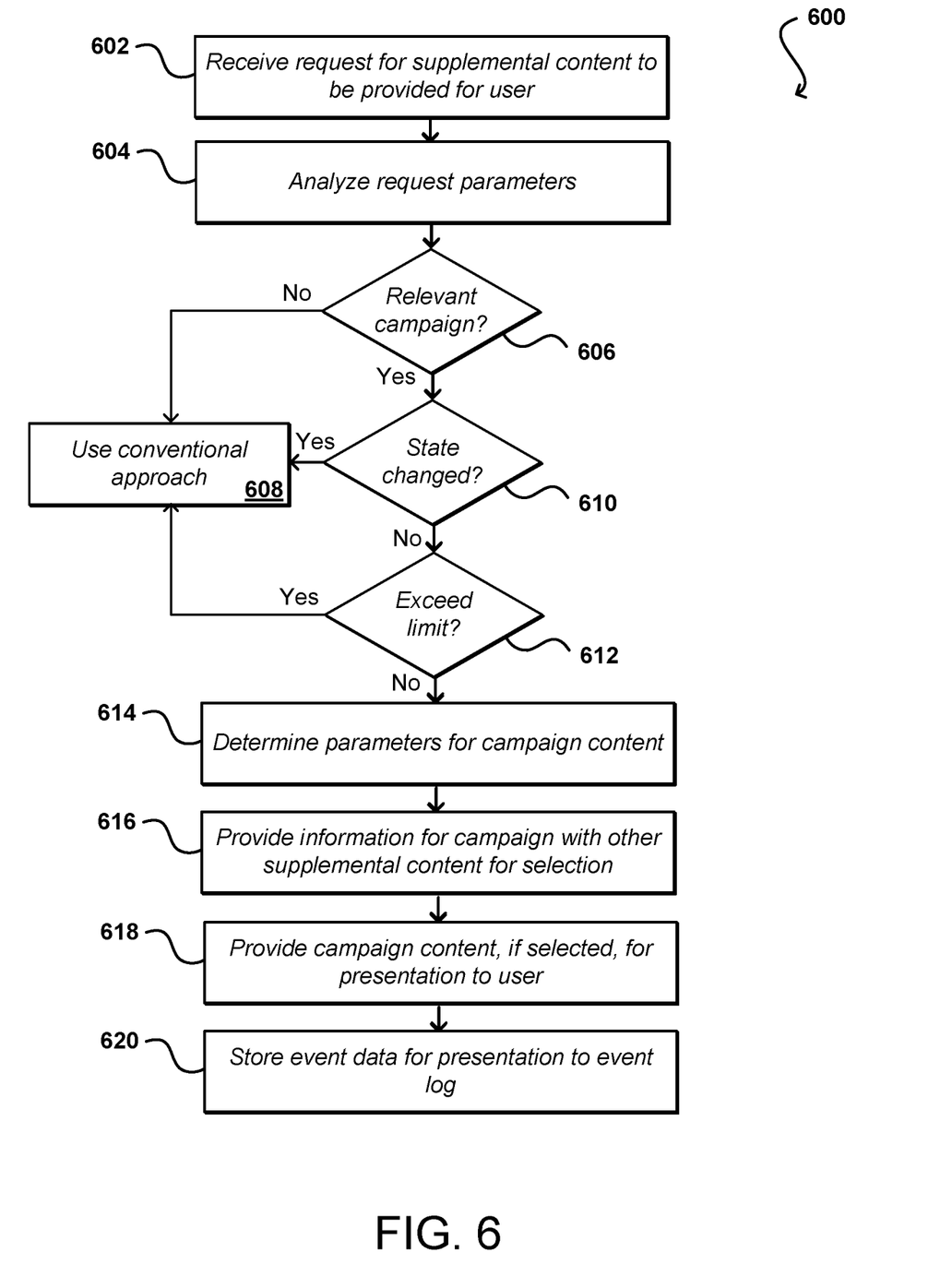
FIG. 6 illustrates an example process for determining whether to provide a campaign communication that can be utilized in accordance with various embodiments.

FIG. 6 illustrates an example process 600 for determining whether to display campaign content for a particular opportunity that can be utilized in accordance with various embodiments. In this example, a request for supplemental content to display to a user is received 602 to a system, service, or component such as a channel manager. This may be an opportunity where content is to be provided, such as for advertising on a webpage, or an opportunity where content may be provided, such as may be part of a scheduled email task or notification task generated from an event queue or other such option. In response to the request, the parameters for the request can be analyzed 604, as may include identifiers for the user, client device, type of content, or other such information. Based at least in part upon the request parameters, a determination can be made 606 as to whether there is a relevant campaign. This can include, for example, determining whether the user is a targeted user for a specific campaign and whether the parameters for the request meet any campaign criteria. If not, then the supplemental content can be selected using 608 any conventional approach, such as to use keyword bidding to select an advertisement or analyze keywords to select notification content.

If there is a relevant campaign for a targeted user corresponding to the request, a determination can also be made 610 as to whether there has been a state change for that user. A state change can indicate that the desired action for the campaign has already occurred or been detected for this particular user such that the campaign content should not be selected, in which case the conventional selection approach should be utilized. If the state change has not occurred and the targeted user should continue to receive campaign content, another determination can be made 612 as to whether displaying the campaign content for this request would exceed any specified limit for the campaign. The limits can include any appropriate limits, such as a maximum frequency across all channels, frequency or number within a specific channel, etc. If so, then the conventional selection approach can be utilized. If the displaying of campaign content would not exceed any specified limits for the campaign then in some instances the campaign content should be selected for presentation, at least where specified by the campaign criteria. In this example, however, the parameters for the campaign content can be determined 614 and information for the campaign can be provided 616 with other supplemental content for selection. As an example, there may be a bid price, ranking, or relevance score associated with the campaign content that can be used to compare the value of the campaign content against various other types of supplemental content that could be provided for this opportunity. The content can be selected using the appropriate selection algorithm, and if the campaign content is selected then the campaign content can be provided 618 for presentation to the targeted user. The event data for the presentation can then be stored 620 to an event log or other such repository. The recording of the displaying can help to ensure that any subsequent opportunities to provide the campaign content are evaluated based on this recent displaying to ensure that no campaign criteria or thresholds are exceeded. Further, any corresponding actions taken can have the appropriate information recorded such that a state change is noted and no further campaign content is provided for display to that particular user.

Figure 7:
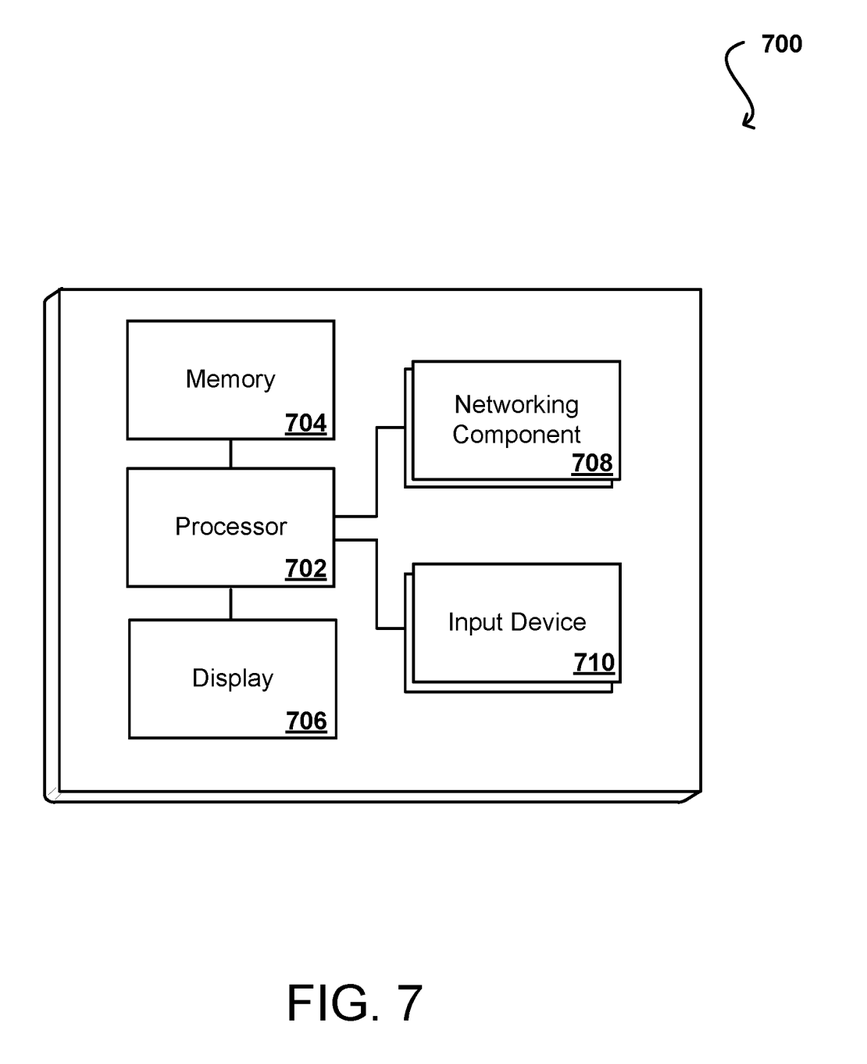
FIG. 7 illustrates example components of a computing device that can be used to implement aspects of various embodiments.

FIG. 7 illustrates a set of basic components of an example computing device 700 that can be utilized to implement aspects of the various embodiments. In this example, the device includes at least one processor 702 for executing instructions that can be stored in a memory device or element 704. As would be apparent to one of ordinary skill in the art, the device can include many types of memory, data storage or computer-readable media, such as a first data storage for program instructions for execution by the at least one processor 702, the same or separate storage can be used for images or data, a removable memory can be available for sharing information with other devices, and any number of communication approaches can be available for sharing with other devices. The device may include at least one type of display element 706, such as a touch screen, electronic ink (e-ink), organic light emitting diode (OLED) or liquid crystal display (LCD), although devices such as servers might convey information via other means, such as through a system of lights and data transmissions. The device typically will include one or more networking components 708, such as a port, network interface card, or wireless transceiver that enables communication over at least one network. The device can include at least one input device 710 able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

As discussed, different approaches can be implemented in various environments in accordance with the described embodiments. As will be appreciated, although a Web-based environment is used for purposes of explanation in several examples presented herein, different environments may be used, as appropriate, to implement various embodiments. The system includes an electronic client device, which can include any appropriate device operable to send and receive requests, messages or information over an appropriate network and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server for receiving requests and serving content in response thereto, although for other networks, an alternative device serving a similar purpose could be used, as would be apparent to one of ordinary skill in the art.

The illustrative environment includes at least one application server and a data store. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device and the application server, can be handled by the Web server. It should be understood that the Web and application servers are not required and are merely example components, as structured code discussed herein can be executed on any appropriate device or host machine as discussed elsewhere herein.

The data store can include several separate data tables, databases or other data storage mechanisms and media for storing data relating to a particular aspect. For example, the data store illustrated includes mechanisms for storing content (e.g., production data) and user information, which can be used to serve content for the production side. The data store is also shown to include a mechanism for storing log or session data. It should be understood that there can be many other aspects that may need to be stored in the data store, such as page image information and access rights information, which can be stored in any of the above listed mechanisms as appropriate or in additional mechanisms in the data store. The data store is operable, through logic associated therewith, to receive instructions from the application server and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated. Thus, the depiction of the systems herein should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, magnetic tape drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
   receiving, by at least one computing device in a resource provider environment, a request to initiate a campaign on behalf of a customer, the campaign specifying campaign content to be displayed to a set of targeted users to prompt the targeted users to take a specified action, the set of targeted users being associated with the computing device;
   enabling the customer to specify, via a first application programming interface (API), one or more campaign criteria for providing the campaign content via a plurality of communication channels;
   determining, based at least in part upon the one or more campaign criteria specified for the campaign, the set of targeted users corresponding to the campaign;
   determining the plurality of communication channels to be used to transmit the campaign content to client devices for displaying the campaign content to the targeted users;
   contacting a channel manager for each type of communication channel of the plurality of communication channels to cause the campaign content to be available for transmission via a respective type of communication channel;
   determining that a specified user of the set of targeted users has taken the specified action in response to the campaign content via a first communication channel of the set of communication channels;
   updating, in an event log, state information for the specified user to indicate that the specified user has taken the specified action;
   determining an opportunity to provide the campaign content to the specified user over a second communication channel of the plurality of communication channels;
   checking the state information using the event log; and
   determining to not transmit the campaign content via the second communication channel to the specified user based at least in part upon the state information for the specified user indicating that the specified user has taken the specified action in response to the campaign content of the first communication channel.

2. The computer-implemented method of claim 1, further comprising:
   causing information for each display of the campaign content to one of the targeted users to be written to the event log; and
   causing the channel managers to check the event log before transmitting the campaign content to a client device for the specified user to ensure that providing the campaign content complies with any of the campaign criteria.

3. The computer-implemented method of claim 2, wherein the campaign criteria includes at least one of a maximum frequency for a specific type of communication channel, a maximum frequency across all communication channels of the plurality of communication channels, a maximum occurrence for a specific type of communication channel, or a maximum occurrence across all communication channels.

4. The computer-implemented method of claim 1, further comprising:
   causing the campaign content to be transmitted for the specified user via the plurality of communication channels per the campaign criteria until the state information for the specified user is updated to indicate that the specified user has taken the specified action.

5. A computer-implemented method, comprising: identifying, by at least one computing device in a resource provider environment, a set of targeted users corresponding to a campaign, the set of targeted users being associated with the computing device, the campaign specifying campaign content prompting a specified action;
   enabling a customer associated with the campaign to specify, via a first application programming interface (API), criteria for providing the campaign content via a set of communication channels;
   causing the campaign content to be provided for presentation to a specified user the set of targeted users via the set of communication channels of at least two different channel types;
   determining, via the computing device, that the specified action has been performed in response to the campaign content via a first communication channel of the set of communication channels, using an electronic device, on behalf of a specified user of the set of targeted users;

updating state information stored in an event log with respect to the specified user to indicate that the specified action has been performed with respect to the specified user;

determining an opportunity to provide the campaign content to the specified user over a second communication channel of the set of communication channels; and determining not to provide the campaign content for presentation via the second communication channel to the specified user based at least in part upon the state information for the specified user indicating that the specified user has taken the specified action in response to the campaign content of the first communication channel.

6. The computer-implemented method of claim 5, further comprising: causing the campaign content to be transmitted for the specified user via the communication channels per one or more campaign criteria until the state information for the specified user is updated to indicate that the specified action has been performed with respect to the specified user.

7. The computer-implemented method of claim 5, wherein the types of communication channels include at least two of electronic mail, instant messaging, supplemental electronic content, in-application content, gaming content, audio communication, video communication, streaming media, broadcast content, physical mail, physical posting, or telephonic communication.

8. The computer-implemented method of claim 5, further comprising:

causing channel managers for respective channels of the set of communication channels to store information for each presentation of the campaign content to the event log; and causing the channel managers to check the event log before transmitting the campaign content to a client device for the specified user to ensure that providing the campaign content complies with campaign criteria.

9. The computer-implemented method of claim 8, wherein the campaign criteria includes at least one of a maximum frequency for a specific communication channel, a maximum frequency across all communication channels, a maximum occurrence for a specific communication channel, or a maximum occurrence across all communication channels.

10. The computer-implemented method of claim 8, further comprising:

analyzing the data in the event log and the state information to determine performance results for the set of communication channels; and causing the campaign data to be provided via the set of communication channels based at least in part upon the performance results.

11. The computer-implemented method of claim 10, further comprising: enabling a customer associated with the campaign to request the performance results via at least one additional API.

12. The computer-implemented method of claim 5, further comprising:

determining at least one selection value for the campaign content for a specific type of communication channel; and enabling a selection algorithm to select from the campaign content and other supplemental content based at least in part upon the at least one selection value.

13. The computer-implemented method of claim 5, further comprising:

enabling communication channels to be added to, or removed from, the set of communication channels for the campaign.

14. A system, comprising:

at least one processor; and memory including instructions that, when executed by the at least one processor, cause the system to:

identify, by at least one computing device in a resource provider environment, a set of targeted users corresponding to a campaign, the set of targeted users being associated with the computing device, the campaign specifying campaign content prompting a specified action;

enable the customer to specify, via a first application programming interface (API), one or more campaign criteria for providing the campaign content via a set of communication channels;

cause the campaign content to be provided for presentation to a specified user of the targeted users via a set of communication channels of at least two different channel types;

determine, via the computing device, that the specified action has been performed in response to the campaign content via a first communication channel of the set of communication channels, using an electronic device, on behalf of a specified user of the set of targeted users;

update state information stored in an event log with respect to the specified user to indicate that the specified action has been performed with respect to the specified user;

determine an opportunity to provide the campaign content to the specified user over a second communication channel of the set of communication channels; and determine not to provide the campaign content for presentation via the second communication channel to the specified user based at least in part upon the state information for the specified user indicating that the specified user has taken the specified action in response to the campaign content of the first communication channel.

15. The system of claim 14, wherein the instructions when executed further cause the system to:

cause the campaign content to be transmitted for the specified user via the communication channels per one or more campaign criteria until the state information for the specified user is updated to indicate that the specified action has been performed with respect to the specified user.

16. The system of claim 14, wherein the instructions when executed further cause the system to:

cause channel managers for respective channels of the set of communication channels to store information for each presentation of the campaign content to the event log; and cause the channel managers to check the event log before transmitting the campaign content to a client device for the specified user to ensure that the providing complies with campaign criteria.

17. The system of claim 16, wherein the instructions when executed further cause the system to:

analyze the state information in the event log and the state information to determine performance results for the set of communication channels; and cause the campaign data to be provided via the set of communication channels based at least in part upon the performance results.

18. The system of claim 14, wherein the instructions when executed further cause the system to:
   determine at least one selection value for the campaign content for a specific type of communication channel; and
   enable a selection algorithm to select from the campaign content and other supplemental content based at least in part upon the at least one selection value.

19. The system of claim 14, wherein the instructions when executed further cause the system to:
   enable the customer associated with the campaign to request performance results via a second API.

* * * * *